UNITED STATES PATENT OFFICE.

ROBERT E. SCHMIDT AND KARL THUN, OF ELBERFELD, GERMANY, ASSIGNORS TO FARBENFABRIKEN OF ELBERFELD CO., OF NEW YORK, N. Y., A CORPORATION OF NEW YORK.

YELLOW-GREEN ANTHRAQUINONE DYE.

No. 812,599.     Specification of Letters Patent.     Patented Feb. 13, 1906.

Application filed September 8, 1905. Serial No. 277,598.

*To all whom it may concern:*

Be it known that we, ROBERT E. SCHMIDT, doctor of philosophy, chemist, residing at Varresbeckerstrasse 22, and KARL THUN, doctor of philosophy, chemist, residing at Katernbergerstrasse 74, Elberfeld, Germany, (assignors to the FARBENFABRIKEN OF ELBERFELD Co., of New York,) have invented a new and useful Improvement in Green Anthraquinone Dye; and we hereby declare the following to be a clear and exact description of our invention.

Our invention relates to the manufacture of new dyestuffs, which are sulfonic acids of the anthracene series. These substances are obtained by condensing the trioxyanthraquinone sulfonic acid having probably the formula,

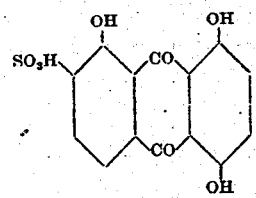

with primary aromatic amins. By this process the two hydroxy groups in 1 and 4 position are replaced by arylamino groups. For the preparation of the new dyestuffs, having probably the general formula,

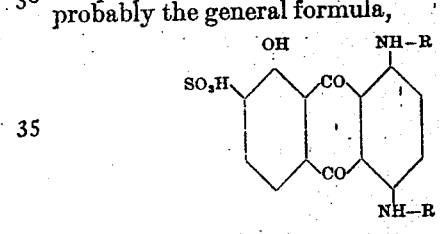

(R meaning an aryl—such as phenyl, tolyl, xylyl, or the like,) any of the methods known for the condensation of oxyanthraquinones with amins can be made use of. For example, the trioxyanthraquinone sulfonic acid or its leuco derivative may be condensed with aromatic amins. On starting from trioxyanthraquinone sulfonic acid the condensation is best carried out in the presence of a reducing agent, such as stannous chlorid or the like.

The new dyestuff sulfonic acids are in the shape of their alkaline salts dark-green powders soluble in hot water with a green color. They dye unmordanted and chrome-mordanted wool green shades.

The trioxyanthraquinone sulfonic acid which is to be used for condensation is prepared by treating 1-4-8-trioxyanthraquinone with sulfonating agents and boric acid.

Example 1: Ten parts, by weight, of 1-4-8-trioxyanthraquinone are added to a solution of ten parts, by weight, of crystallized boric acid in two hundred parts of fuming sulfuric acid, (thirty per cent. of $SO_3$.) It is heated to 130° centigrade until a test portion is soluble in water. The mass of the reaction is run into one thousand parts of ice-water, and the crystals separated out are filtered off. Ten parts of stannous chlorid, ($SnCl_2 + 2H_2O$,) five parts of crystallized boric acid, and ten parts of the above 1-4-8-trioxyanthraquinone sulfonic acid are introduced into one hundred parts of molten paratoluidin. It is heated while stirring to 100° to 120° centigrade under access of the atmospheric air. When the green color of the mixture does not change any more, it is allowed to cool to 70° centigrade. It is mixed with methylic alcohol, the thus-obtained precipitate is filtered off and washed with methylic alcohol. The new sulfonic acid is then converted into its sodium salt by treatment with sodium carbonate.

Instead of paratoluidin other aromatic amins—such as anilin, meta-xylidin, or the like—may be used.

The dyestuff of Example 1 can also be obtained by treating the 1-4-diparatolyldiamido-8-oxyanthraquinones with sulfonating agents and boric acid.

Example 2: Fifteen parts, by weight, of crystallized boric acid are mixed with two hundred parts, by weight, of fuming sulfuric acid, (twenty per cent. of $SO_3$.) After the boric acid is dissolved and the solution has cooled to 30° centigrade, twenty parts, by weight, of 1-4-diparatolyldiamido-8-oxyanthraquinone are stirred therein. Stirring is continued at 30° to 40° centigrade until a test portion is soluble in a solution of pyridin in water containing from ten to twenty per cent. of pyridin. The product of the reaction is then run into three thousand parts, by weight, of water. The thus-precipitated sulfonic acid is filtered off and washed with cold water. It is converted into its sodium salt by dissolving in boiling water and reprecipitation with common salt.

The new dyestuff having probably the formula

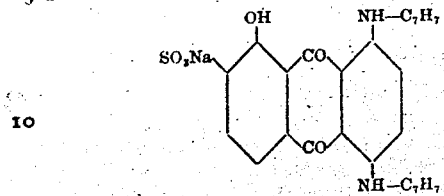

is a dark-green powder, which is soluble in concentrated sulfuric acid with a violet-blue color. If the new dyestuffs are dissolved in dilute acetic acid and then treated with a solution of stannous chlorid in hydrochloric acid, they are decomposed under the formation of a leuco compound of the 1-4-8-trioxyanthraquinone sulfonic acid. It dyes unmordanted and chrome-mordanted wool yellowish-green shades.

Having now described our invention and in what manner the same is to be performed, what we claim as new, and desire to secure by Letters Patent, is—

1. The herein-described dyestuffs of the anthracene series, being 1-4-diaryldiamido-8-oxyanthraquinone sulfonic acids containing the sulfonic group in the anthraquinone nucleus, obtainable by condensing with primary aromatic amins 1-4-8-trioxyanthraquinone sulfonic acid which is prepared by treating 1-4-8-trioxyanthraquinone with sulfonating agents and boric acid, which dyestuffs are in the shape of their alkaline salts dark-green powders soluble in hot water with a green color and when the dyestuffs dissolved in acetic acid are treated with a solution of stannous chlorid in hydrochloric acid they are decomposed under the formation of a leuco compound of the 1-4-8-trioxyanthraquinone sulfonic acid; and dyeing unmordanted and chrome-mordanted wool green shades, substantially as hereinbefore described.

2. The herein-described new dyestuff of the anthracene series, being 1-4-diparatolyldiamido-8-oxyanthraquinone sulfonic acid containing the sulfonic group in the anthraquinone nucleus, obtainable by condensing with paratoluidin the 1-4-8-trioxyanthraquinone sulfonic acid which is prepared by treating 1-4-8-trioxyanthraquinone with sulfonating agents and boric acid, which dyestuff is in the shape of its sodium salt a dark-green powder soluble in concentrated sulfuric acid with a violet-blue color and when the dyestuff dissolved in acetic acid is treated with a solution of stannous chlorid in hydrochloric acid it is decomposed under the formation of a leuco compound of the 1-4-8-trioxyanthraquinone sulfonic acid, and dyeing unmordanted and chrome-mordanted wool yellowish-green shades, substantially as hereinbefore described.

In testimony whereof we have signed our names in the presence of two subscribing witnesses.

ROBERT E. SCHMIDT.
KARL THUN.

Witnesses:
OTTO KÖNIG,
J. A. RITTERSHAUS.